Patented Apr. 10, 1928.

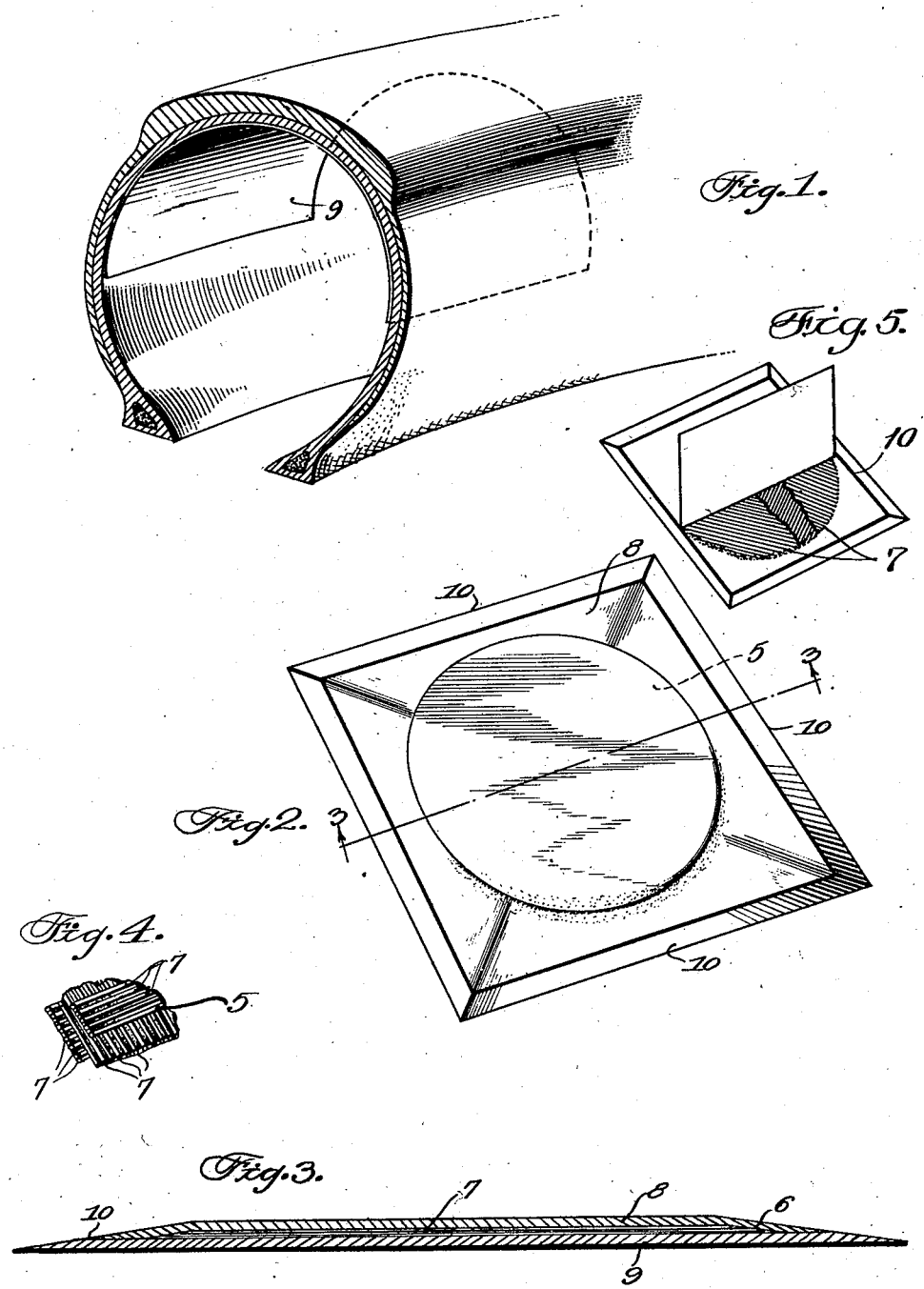

1,666,009

UNITED STATES PATENT OFFICE.

MARTIN OSCAR HANEY, OF IOLA, KANSAS.

TIRE BOOT.

Application filed May 27, 1927. Serial No. 194,779.

My invention relates to internal boots or blow out patches for pneumatic tires.

With tire boots or blow out patches now commonly used a textile fabric body is provided which is secured to the inner walls of the tire shoe by a suitable adhesive. Tire boots or patches thus constructed are objectionable in that the adhesive melts or gums by reason of the heat generated by the road travel and expansion of the tire, permitting the patch to pull away or shift from its original position leaving a coating of this gummed substance upon the walls of the tire shoe which adheres to the pneumatic tube and chafes the latter. Moreover this condition causes the pneumatic tube to adhere to the walls of the shoe making its removal impossible without damaging or ruining the tube.

With these difficulties in mind it is the principal object of this invention to provide an internal boot or blow out patch, which after being secured in place within the tire shoe, will remain affixed to the walls of the latter regardless of the heating and expansion of the tire thereby preventing the adhesive from contacting with the tire tube.

Another object of the invention is to provide an internal tire boot or blow out patch which will stretch or contact with the expansion and contraction of the tire shoe and remain fast to the walls of the latter.

The invention also contemplates a device of this character which will afford a maximum support and protection to the pneumatic tube and permit the tire to be rolled a reasonable distance while flat or inflated to a minimum degree without damaging the patch any more than the tire.

It is another object of my invention to provide an internal tire boot or patch wherein the textile body or reinforcing element is entirely enclosed thus obviating damage to the inner tube by roughened particles such as the cords or strands forming the textile fabric.

With the preceding and other objects in mind the invention consists in the combination, arrangement of parts, and operations to be hereinafter specifically referred to, claimed and illustrated in the accompanying drawings where;

Figure 1 is a perspective of a section of tire shoe having my improved boot or patch applied thereto;

Figure 2 is a perspective of the boot or patch;

Figure 3 is a sectional view of the same taken on line 3—3 of Figure 2, and

Figure 4 is a detail perspective of the reinforcing pad and illustrating the arrangement of the reinforcing laminations, and, Figure 5 is a detail view of the reinforcing pad embodied in the invention.

Referring to the invention in detail an elastic circular reinforcing pad 5 of such diameter as to extend over a substantial area of the crest of the tire shoe 5' so as to project an appreciable distance beyond all sides of the blow out or rupture, is provided. The upper face of the pad 5 is skived from a point adjacent its outer edge to its outer edge as indicated at 6 to reduce the thickness of the pad at the zone.

This pad 5 is preferably formed of rubberized fabric of suitable thickness having one or more laminations of parallel reinforcing cords or strands 7 incorporated therein with the cords or strands of one ply intersecting those of the alternate ply. These plies are disposed in spaced relation to eliminate wear by friction and the strands of each ply extend diagonally with respect to the transverse axis of the crest of the shoe to increase the strength and durability of the pad.

I have found that a circular pad is the most advantageous in that it produces a maximum support for the pneumatic tube and offers but a minimum rolling resistance to the tire shoe. However, this pad may be fashioned in any other configuration that will prove practical.

The elastic pad 5 is confined centrally between superimposed rectangular cured rubber sheets 8 and 9 of sufficient size to extend across the crest of the tire shoe and around a substantial area of the side walls thereof as illustrated in Figure 1. A suitable adhesive is applied to the opposite faces of the rubber sheets to secure these parts together as a unit. It is desirable to subject these rubber sheets and pad thus assembled to pressure rolls to produce an effective bond between the parts.

To eliminate obstructions in the tire shoe to interfere with the proper positioning of the pneumatic tube the upper faces of the sheets 8 and 9 at their edges are skived parallel to the skived outer edge of the pad 5 as indicated at 10.

In use, the interior of the shoe and the skived edges of the sheets are coated with a suitable air curing adhesive after first preparing the shoe as by buffing or washing with gasoline. The boot or patch is now applied to the interior of the shoe with the pad 5 directly beneath the rupture or blow out. Pressure is then applied to the shoe and boot or patch and the adhesive allowed to dry permanently securing the patch and shoe together.

By entirely enclosing the laminated structure between the rubber sheets the pneumatic tube is protected against friction and the resultant chafing obviated. It will also be observed that the device will stretch or expand as the tire expands incident to road travel and thus support and protect the pneumatic tube at all times.

What is claimed is:

1. An internal tire boot including a relatively flat elastic casing to be secured to the inner walls of a tire shoe and having its marginal portions tapered, and a compressible element held within the casing and having its edges tapered in a plane parallel to the tapered edges of the casing.

2. In a repair patch for tire shoes, a flat compressible element of sufficient size to extend over a substantial area of the crest of a tire shoe and having flexible strands incorporated therein, and sheets of superimposed elastic material between which the compressible element is disposed, one of which is arranged to be fastened to the walls of the shoe, and means uniting the compressible element and sheets together.

3. An internal tire boot including a flat relatively thin casing, a compressible reinforcing pad secured within the casing composed of a plurality of spaced reinforcing laminations composed of textile strands incorporated therein, the alternate laminations being arranged in crossed relation with the textile strands of each alternate lamination extending in opposite diagonal directions across the pad, one wall of the casing being arranged to be fastened to the walls of a tire shoe whereby the boot is caused to expand and contract with the tire according to the air pressure therein.

MARTIN OSCAR HANEY.